W. J. CRUMPTON.
ACCOUNTING SYSTEM.
APPLICATION FILED OCT. 13, 1909.
1,084,615.
Patented Jan. 20, 1914.
2 SHEETS—SHEET 2.
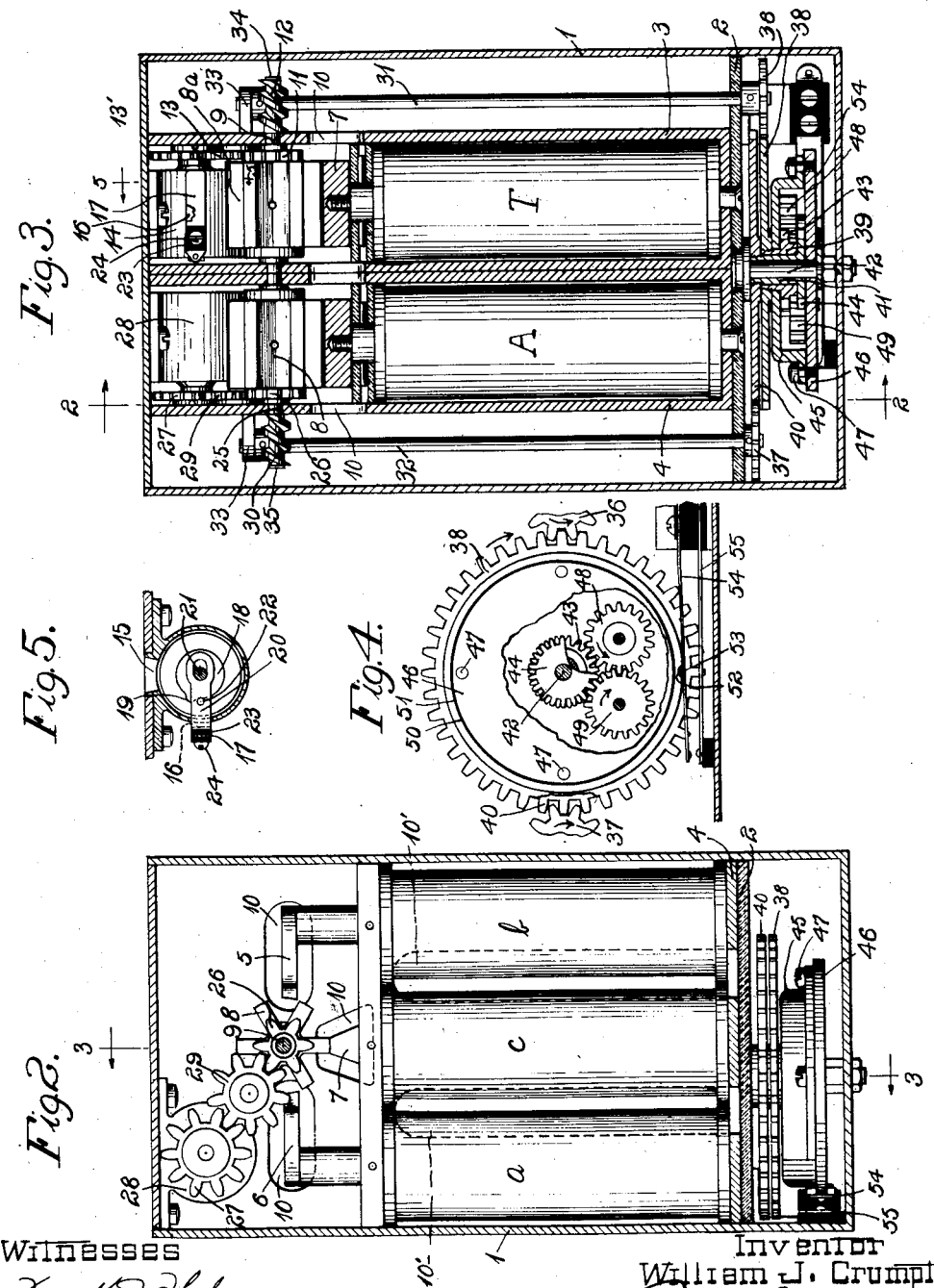
Witnesses
Frank J. Thelen
Leonard W. Novander
Inventor
William J. Crumpton
By Thomson Williams
Attorneys

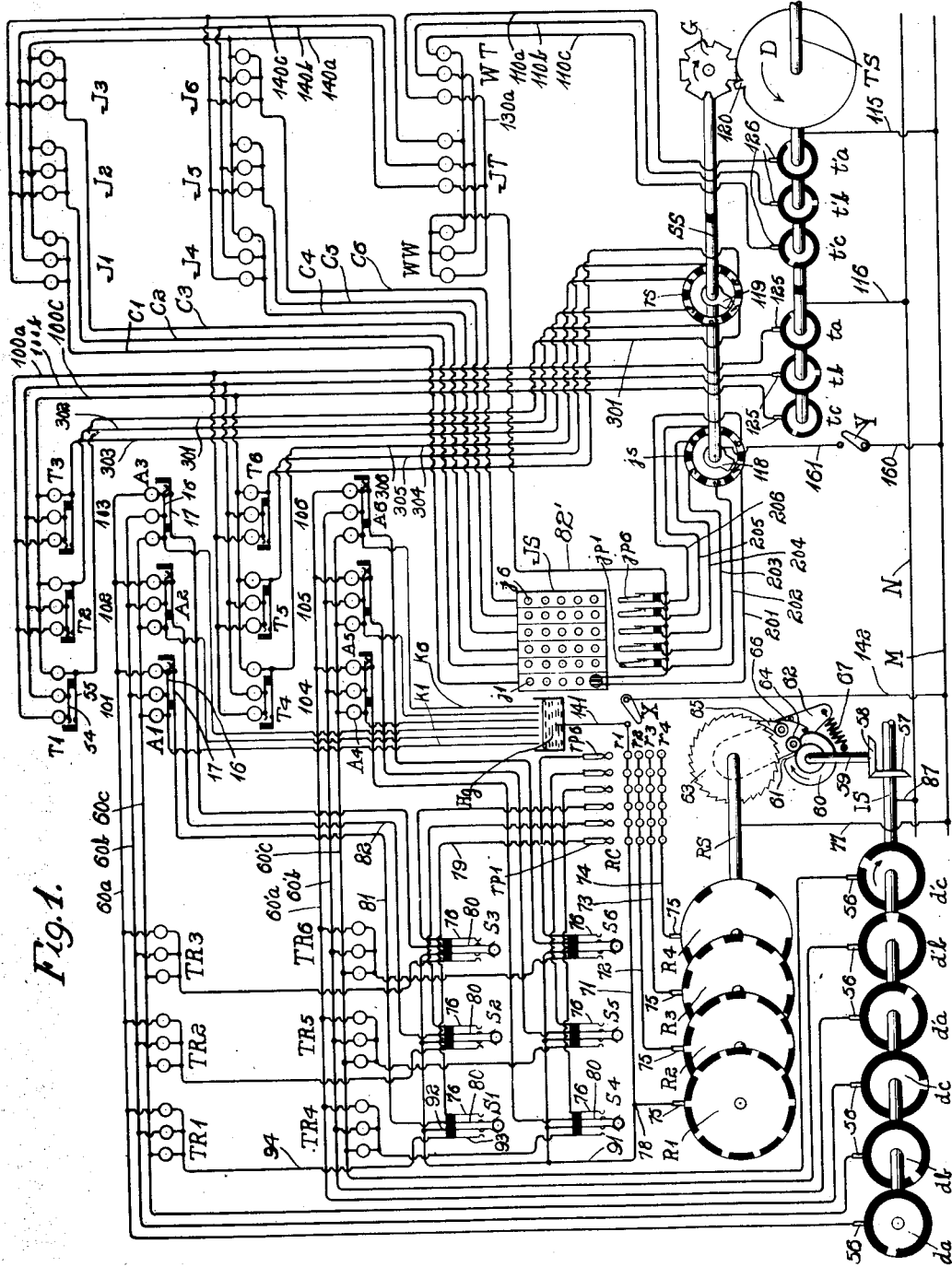

UNITED STATES PATENT OFFICE.

WILLIAM J. CRUMPTON, OF EVANSTON, ILLINOIS, ASSIGNOR, BY MESNE ASSIGNMENTS, TO WILLIAM R. HEATH, OF BUFFALO, NEW YORK.

ACCOUNTING SYSTEM.

1,084,615.  Specification of Letters Patent.  Patented Jan. 20, 1914.

Application filed October 13, 1909. Serial No. 522,382.

*To all whom it may concern:*

Be it known that I, WILLIAM J. CRUMPTON, a citizen of the United States, residing at Evanston, in the county of Cook and State of Illinois, have invented a certain new and useful Improvement in Accounting Systems, of which the following is a full, clear, concise, and exact description, reference being had to the accompanying drawings, forming a part of this specification.

My invention relates to electrically controlled accounting systems, and is especially applicable to systems of time-, wage-, job- and cost-accounting where the entries made are generally, though not necessarily, functions of time. In electrical systems of this kind the registers are actuated on one step every time a current impulse passes through the circuit in which the register is connected. Obviously, the rate of actuation of any register will depend upon the rate at which the impulses actuate the electromagnetic mechanism of the register. Inasmuch as in accounting systems we are largely concerned with the totalization of various classes of entries, the circuit connections must be such as to permit the impulses which actuate the individual registers to be totalized in one or more summation registers. For example, we have a given number of individual wage-registers, each assigned to a workman, and each register is actuated at a certain rate by the proper number of impulses passing through the register in a given period, it stands to reason that to totalize the actuations of those registers (which simply means totalizing the number of impulses sent through the registers), the impulses must pass successively through the totalizing register. Should two or more impulses pass through the totalizing-register simultaneously, no correct total can be obtained, for the reason that the simultaneous impulses would have the effect of but a single impulse. In my co-pending application, Serial No. 437,809, filed June 11, 1908, the individual registers are so connected with a source of electrical impulses that the actuating current is sent through the registers in succession, or, as it is commonly termed, the registers are "picked up" one after the other. In this way the impulses that actuate the individual registers are sent through the circuit of the totalizing register in succession, whereby the amount of actuation of the totalizing-register is equal to the sum of the actuations of the individual registers. In said co-pending case the totalizing-register is connected in a common wire forming part of all of the circuits which are successively closed through the electromagnetic actuating mechanisms of the workmen's individual registers. The successive closure of the circuits is accomplished by means of a selector mechanism, which in the particular instance shown comprises a rotating brush and a stationary commutator ring, to whose segments the individual registers are electrically connected. As the brush rotates and comes successively into contact with the segments of the commutator, the circuits are closed through the workmen's registers one after the other. The selector-mechanism is connected with the rate-controlling mechanism, and, like the latter, is clock-controlled.

One of the main objects of my present invention is to do away with the selector mechanism between the source of impulses and the wage-registers so as to enable the workmen's wage-registers, as well as time-registers, to be actuated concurrently as distinguished from intercurrently. More strictly speaking, I should rather say that the individual registers are simultaneously connected with the source of impulses for actuation. As to whether they are simultaneously actuated, depends upon the particular rates with which the registers are involved. If the registers were operating all at the same rate, then the actuations of the registers would be simultaneous. If they operate each at a different rate, the actuations would take place in accordance with such rates, although the fact would still remain that all of the registers would be simultaneously connected for actuation.

In order to totalize the actuations of the individual registers, I have provided means for causing the successive closure of circuits through the totalizing-registers at a rate equal to the sum of the rates at which the circuits are closed through the individual registers. I accomplish this by a specially designed motor mechanism comprising an accumulating member and a transfer member. Each of these members consists of a plurality of electromagnets adapted to be successively energized to produce rotation of an associated armature. Inasmuch as the particular embodiment illustrating my invention has, for the sake of convenience, been shown as a three-impulse system, the two members of the motor mechanism are each in effect a three-phase motor, which in principle and operation is similar to the motor described and claimed in my co-pending application, Serial No. 498,547, filed May 26, 1909, except that the arrangement of the electromagnets in the present case is such as to require but a single armature, whereas in said co-pending application there is an armature for each electromagnet. The windings of the accumulating member are connected in the wage-circuits of the system, which circuits are under the control of a rate mechanism. The windings of the transfer member are included in the circuits of the job-registers and totalizing-registers, which circuits are entirely separate and distinct from the wage-circuits, and are moreover not controlled by clock mechanism—at least they need not be so controlled, as will hereinafter more fully appear. The two armatures of each motor mechanism are connected to a differential gear, whose common member rotates at a rate proportional to the difference between the rates of actuation of the armatures. This common member operates a switch for controlling the circuit of the transfer member. The result of this construction is that when the common differential member is moved from its normal or initial position by the armature of the accumulating member, the circuit is automatically closed through the transfer member to cause its associated armature to be actuated the same amount as the armature of the accumulating member. Now, it is evident that by connecting a register with the transfer armature, the rate of actuation of that register will be proportional to the frequency of the impulses sent through the accumulating member. It should also be evident that whatever registers are included in the circuit of the transfer-members the motor mechanisms will be actuated at a rate proportional to the sum of the rates of current impulses passing through the transfer members,—provided, of course, that the circuits through the transfer members of the various motor mechanisms are closed in succession. This is taken care of by the selector mechanism included in the transfer circuits between the source of impulses and the totalizing-registers. Although this selector mechanism may conveniently be driven from the clock-controlled shaft which drives the rate mechanism, it may be actuated independently of the rate mechanism and at a higher speed. This arrangement of the selector mechanism away from the clock-controlled devices of the system permits operation of the selector at such speed as to render the system practical for the handling of a greater number of men than is possible with such a system as shown in my co-pending application, Serial No. 437,809, where the operation of the selector mechanism is required to be clock-controlled.

In the present system there is a motor mechanism assigned to each workman, whereby these mechanisms become in reality individual mechanisms and are thus distinguishable from the differential substation units of my co-pending application, Serial No. 498,547. The accumulating member with its associated register of each motor mechanism in the present case is to all intents and purposes an individual wage-register, while the register associated with each motor mechanism in said co-pending application acts as a totalizing-register for several substations, when the discharges coming from the various substations are stored up in the substation unit. The motor mechanism of the present invention does not permit of such storing, but operates after the manner of a relay by sending out or passing along the impulses that come in. For this reason it will be convenient to designate the motor mechanisms of the present invention as relay units. A group of such relay units might properly be termed a relay station or substation. In my co-pending application, Serial No. 517,969, filed September 16, 1909, the three-phase motor mechanisms are constructed to operate ballistically by virtue of having opposing forces act simultaneously upon the armature. As pointed out in said co-pending application, perhaps the principal distinguishing characteristic of these ballistic substation units is the entire absence of differential gearing, whereas the relay units of this case and the reservoir units of my co-pending application, Serial No. 498,547, require the use of differential gearing.

The above and other characteristic features and advantages of my invention will be fully appreciated as the specification proceeds.

Referring to the accompanying drawings, Figure 1 is a diagram of a system embodying my invention; Fig. 2 is a side view of a relay unit taken on line 2, 2 of Fig. 3; Fig. 3 is a sectional view on line 3, 3 of Fig. 2, certain of the parts being shown in full for the sake of clearness; Fig. 4 is a view of the differential gears with which the armatures of the relay unit are connected, certain of the parts being partially broken away to expose certain other parts; Fig. 5 is a detail view taken on line 5, 5 of Fig. 3, showing a convenient arrangement for causing a register to open the associated pair of contacts as the register passes through the "nine" position during the resetting operation.

Before attempting to explain and follow the various circuits as shown in Fig. 1, it will be well to first take up a description of the construction and operation of the relay unit as shown in Figs. 2, 3 and 4. Within the casing 1 is the nonmagnetic partition 2, to which are secured the magnetic sheaths 3 and 4. As seen in Fig. 3, these sheaths are U-shaped in cross-section and form an inclosure for the two groups of magnets with their associated armatures. As shown in Fig. 2, there are three electromagnets in each group, of which the top magnets are shown in Fig. 3. Considering the group of electromagnets shown in Fig. 2, the magnets $a$, $b$ and $c$ are provided with polar projections 5, 6 and 7, respectively, having their free ends arranged in the arc of a circle, the center of which forms the axis of rotation of the armature 8, fixed upon the shaft 9. This shaft is journaled in the side walls of the iron sheath 3. The armature 8 consists of six radial arms adapted to move in close proximity to the polar projections. When the electromagnets are energized, the resultant flux is conveyed through the iron sheath and finds the path of least reluctance through the body of the armature. In order to render the path for the flux around the armature one of high reluctance so as to compel the flux to seek its way through the armature, the iron sheaths 3 and 4 are provided with openings 10 in the sides. As shown in Fig. 2, these openings are so arranged that the air gaps between the sides of the sheaths and the polar projections of the electromagnets are greater than the gaps between the armatures and the associated polar projections. Additional openings 10' may be provided longitudinally in the sheaths to provide for a better concentration of the flux with respect to each magnet. With the armature in the position in which it is shown in Fig. 2 it will be apparent that if electromagnet $a$ be energized, the armature will receive a one-step advancement counter-clockwise until the armature pole nearest the polar projection 5 is substantially in alinement with said polar projection. Then, if the electromagnet $b$ be energized, the armature will be given another one-step advancement in the same direction until the armature pole nearest the polar projection 6 is substantially in alinement with said projection. This will bring the armature within the influence of electromagnet $c$, and upon energization of the latter will receive a third actuation in the same direction. It should be clear that the rate of actuation of the armature will depend upon the frequency of the impulses passing through the electromagnets. Furthermore, the direction of rotation of the armature may be readily varied by changing the order in which the impulses are impressed. The shaft 9 has secured thereon the gear wheel 11 and the worm gear 12, the latter being outside of the sheath 3. The gear 11 engages the idler 13 (carried by the sheath 3), which in turn engages the actuating gear 13' of the register 14. This register is secured to the front of the casing. As shown in Fig. 5, a sight opening 15 permits one to read the indication of the register. This register may be an ordinary counter having decimally arranged numeral-wheels and carry-over mechanism. As will subsequently appear, these registers are periodically decumulated.

In order to prevent decumulation of the register beyond zero and to avoid the exercise of special care to prevent the register from running beyond zero, I associate with each register a pair of contacts diagrammatically indicated in Fig. 1 at 16 and 17. The long contact 17 is shown in plan in Fig. 3 and in section in Fig. 5. The highest-order numeral-wheel of the register has rigidly connected therewith the disk 18, having a cam projection 19. An arm 20 has slotted connection with the shaft 21, on which the numeral-wheels are mounted, and has a pin 22 extending into the path of travel of the cam projection 19. The upper end of the arm is provided with an insulating portion 23 extending directly underneath the contact 17. The two contacts are mounted upon a suitable insulating support and secured thereto by the screw 24. Normally the contacts are in engagement with each other to close the circuit through the group of electromagnets $a$, $b$ and $c$. However, as the register passes through the "nine" position, the cam projection 19 will engage the pin 22 and cause the arm 20 to force the contact 17 away from the contact 16, whereby the circuit through the electromagnets is interrupted and further actuation of the register prevented. I lay no claim to this particular feature of my invention in this application, for the reason that it is claimed in my copending application, Serial No. 437,809. Any suitable means may be provided for automatically stopping the actuating mechanism of the register when the same has reached its normal position during the resetting operation.

Although I have shown the armature 8$t$ connected with a register, the presence of the latter is by no means necessary for the operation of my system, and may be omitted without in any way disturbing the function or operation of the motor mechanism. The iron sheath 4 surrounds a group of three magnets similar to the group already referred to. For the sake of convenience and brevity, we will designate the group of magnets $a$, $b$ and $c$ as the accumulating magnets A and refer to the second group of electromagnets as the transfer magnets T. The polar projections of the magnets T are arranged similarly to the polar projections of the magnets A and the armature 8$t$ is mounted upon the shaft 25 to receive one-step actuations when the magnets T are successively energized. If we assume that the magnets A are energized to cause rotation of the armature 8a counter-clockwise, as already described, the order in which the impulses are impressed upon the magnets T is such as to produce rotation of the armature 8t in a clockwise direction. The shaft 25, which is journaled in the sides of the sheath 4 in alinement with the shaft 9 but independently thereof, is provided with the gear wheel 26, which conveys the movement of the armature to the actuating gear 27 of the register 28 through the medium of the idler 29 mounted upon the side of the sheath 4. The register 28 may be just an ordinary counter like the register 14, except that it is not provided with zero contacts. By thus securing the registers upon the front of the casing and providing proper sight openings, a workman (or whoever is permitted to do so) may observe the amount of wages which he had earned during a certain period. The shaft 25 has an extension on which is mounted the worm gear 30. A pair of shafts 31 and 32 is at one end journaled in the partition 2 and at the other end supported by the brackets 33. The shaft 31 is provided with a spiral gear 34, which is in engagement with the worm gear 12. Similarly, the shaft 32 has fixed thereon a spiral gear 35, which meshes with the worm gear 30. The other ends of the shafts 31 and 32 carry the gears 36 and 37, respectively. The gear 36 is in mesh with the large gear 38, which is shown as screwed upon the sleeve 39. The gear 37 is in engagement with the large gear 40 fixed upon the free end of the sleeve 41. The stud 42, which is mounted at its ends in the partition 2 and the rear of the casing 1, supports the sleeve 41, the latter being rotatable on the shaft. The sleeve 39, which is shorter than the sleeve 41, is carried by the latter so as to be rotatable thereon. This permits independent rotation of the gears 38 and 40. The sleeve 39 is shown as an integral extension of the gear 43, while the sleeve 41 has integral therewith the gear 44. Mounted upon the sleeve 39 so as to rotate therewith, is a frame comprising the flanged annular member 45 and the disk 46, the two parts being secured together by means of screws or bolts 47. These members, as will be seen from Fig. 3, inclose the gears 43 and 44.

A gear 48 carried by the frame within the recess thereof is in engagement with the gear 43. A similar gear 49 also mounted upon the frame in the recess meshes with the gear 44. As shown in Fig. 4, the gears 48 and 49 are always in engagement with each other. The disk 46 is provided with a rim or tire 50, which is insulated from the main portion of the disk by insulation 51. The tire 50 is provided with a recess 52, within which normally rests the projection 53 carried by the spring contact 54, thus permitting this contact to remain out of engagement with its associated contact 55. It may here be stated that these two contacts are in the circuit of the transfer electromagnets T. As long as the projection 53 rests in the recess 52, the circuit through these electromagnets remains open. When, however, there is a movement of the common differential member one way or another, so as to force the projection 53 out of the recess 52, the two contacts will be brought together and the circuit through the transfer electromagnets T will be closed. The contacts 54 and 55 are diagrammatically indicated in Fig. 1. The operation of this differential transmission connection is as follows: Let us assume that the gears 36 and 37 will be rotated by their respective armatures in the directions indicated by the arrows in Fig. 4. We will assume for the moment that the gear 36 is being actuated counter-clockwise, while the gear 37 remains stationary. The rotation of the gear 36 will cause a rotation of the large gear 38 in a clockwise direction, as indicated by the arrow in Fig. 4. The movement of the gear 38 will be communicated to the gear 43, which in turn will actuate the gear 48 counter-clockwise, as indicated by the arrow. Inasmuch as the gear 48 engages the gear 49, the latter will be actuated in a clockwise direction and will climb around the stationary gear 44 with which it meshes. This planetary movement of the gear 49 will result in a bodily rotation of the frame itself. This will cause the contact 54 to engage its companion contact 55, thereby closing the circuit through the transfer electromagnets T. The armature 8t will thereupon drive the gear 37 in a clockwise direction, as previously explained. We may for the moment assume that the armature 8a, and therefore the gear 43, is stationary. The clockwise rotation of the gear 37 will produce counter-clockwise rotation of the large gear 40 and the connected small gear 44. The latter being in engagement with the gear 49 on the frame, that gear will receive motion in a clockwise direction. At the same time the gear 48 will be rotated counter-clockwise and will climb around the gear 43. This, of course, will produce a rotation of the frame in a direction opposite to the previous rotation and bring the recess 52 of the frame back into alinement with the projection 53 to cause separation of the contacts 54 and 55. This breaks the circuit through the transfer electromagnets T and stops rotation of the armature 8t. In actual practice the armature 8a will not always remain stationary when the transfer electromagnets T are energized, but the two gears 36 and 37 may be simultaneously rotating in their respective directions. If the speed of the rotation of these gears is equal, there will be no movement of the frame which controls the switch contacts and the latter will remain in their closed position. If the speed of rotation of the gear 36 exceeds that of the gear 37, the frame will be rotated to cause closure of the circuit through the transfer electromagnets T. As soon as this closure is effected the gear 37 will rotate to produce movement of the frame in the reverse direction until the recess 52 is brought back into alinement with the projection 53 on the contact 54. The speed of rotation of the gear 37 will, of course, not be less than that of the gear 36 and will preferably be greater. From this description of the construction and operation of the motor mechanism, it will be apparent that the effect of such operation is to intermittently close and open the circuit through the transfer electromagnets T through the instrumentality of the frame, which may be referred to as the common differential member of the differential transmission connections between the two armatures. The movement of this common member in either direction will always be less than one revolution; ordinarily it will simply oscillate back and forth through a comparatively small angle.

The unitary structure which I have just described is to all intents and purposes a register comprising a pair of electromagnetic actuating devices, which operate a switch that controls the circuit through one of the devices. A series of numeral-wheels is associated with the last mentioned device to be actuated thereby. Inasmuch as the amount of rotation of the armature 8t whenever the transfer electromagnets T are energized is always the same as the previous amount of actuation of the armature 8a under the influence of the accumulating electromagnets A, it follows that the rate of actuation of the armature 8t will be proportional to the frequency of the electrical impulses passing through the electromagnets A. This is true even though the circuit of the transfer electromagnets T is entirely separate and distinct from the circuit of the accumulating electromagnets A, for the reason that the period of closure of the switch contacts 54 and 55 is primarily dependent upon the rate of actuation of the armature 8a.

Being thus fortified with an understanding of the construction and operation of my novel form of motor mechanism which is used in the system of my invention, we are in position to direct our attention to the system itself as diagrammatically represented in Fig. 1. Upon the clock-controlled impulse shaft IS is fixed a series of impulse disks $da$, $db$, and $dc$, and $d'a$, $d'b$, and $d'c$, having each a metallic segment peripherally disposed so as to be engaged by the associated brush 56. For the sake of convenience and simplicity, these metallic segments are shown integral with the main metallic portions of the impulse disks, which metallic portions are represented as being in electrical contact with the shaft IS. The gear 57 fixed upon the shaft IS engages the gear 58 secured upon one end of the shaft 59. The other end of the shaft 59 carries the cam 60, which is provided with a peripheral cam portion 61. The arm 62, which is fixed upon the rate shaft RS beside the ratchet wheel 63, has journaled thereon the roller 64, which is located in the path of travel of the cam 60. A pawl 65, pivoted upon the arm 62, engages the teeth of the ratchet wheel 63, such engagement being insured by the spring 66. An extension spring 67 normally tends to move the arm 62 in a clockwise direction. As the cam 60 rotates, the roller 64 will ride up and down the cam portion 61, thus causing forward and backward movement of the arm 62. Each forward movement causes the pawl 65 to move the ratchet wheel 63 a distance equal to the space of one tooth. The backward or clockwise movement of the arm 62 causes no actuation of the ratchet wheel, since the pawl slides over the ratchet teeth. For the present we may omit further consideration of this rate-controlling mechanism until after we have traced some of the register-actuating circuits. In Fig. 1 the diagrammatic representation of the motor mechanisms, structurally shown in Figs. 2, 3 and 4, consists of groups of circles of three each, each circle indicating one of the electromagnets $a$, $b$ or $c$, previously referred to in connection with Fig. 2. Thus the three circles, indicated as a whole by A1, are intended to represent the accumulating electromagnets of the relay unit 101, which we may assume to belong to the workman No. 101. The transfer electromagnets of that same unit are as a whole indicated by the reference letter T1. Similarly, the relay unit assigned to workman No. 102 is indicated as a whole by the reference numeral 102, the accumulating member and the transfer member being indicated by A2 and T2, respectively. In the same way are the accumulating and the transfer electromagnets, or windings, as we may briefly call them, of the relay units 103, 104, 105 and 106 indicated by the reference letters A and T having the numeral suffixes 3, 4, 5 and 6, respectively. When considered by itself the mechanism shown in Figs. 2, 3 and 4 might be termed a relay register mechanism. However, in connection with the system we shall conveniently refer to these mechanisms as relay units, for reasons explained in the fore part of this specification. The individual time-registers are diagrammatically indicated at TR1 to TR6. These registers are structurally ordinary three-phase motors provided with a counter. One form of such three-phase motor is shown in Figs. 6 and 7 of the drawings in my copending application, Serial No. 498,547, where a three-phase register-actuating motor is claimed broadly. Or, one may simply take one of the actuating mechanisms, as shown in Figs. 2 and 3, and connect a counter with the armature.

The numerical suffixes in the reference characters TR1, TR2, etc., are used to indicate to the observer which time-register corresponds with any particular relay unit. Thus, time-register TR3 is assigned to the workman whose relay unit is 103; and so on. The workman's "in" and "out" switches are shown at S1, S2, S3, S4, S5 and S6. The accumulating windings A1, A2 and A3 of the units 101, 102 and 103, respectively, are connected to conductors 60a, 60b and 60c. To these same conductors are also connected the windings of the time-registers TR1, TR2 and TR3. The suffixes "a", "b" and "c" are here used to indicate that the a-phase windings are connected with conductor 60a, the b-phase windings with the conductor 60b, and the c-phase windings with the conductor 60c. The accumulating windings A4, A5 and A6 of the relay units 104, 105 and 106, respectively, are connected with the conductors 60'a, 60'b and 60'c. To these same conductors are also connected the windings of the time-registers TR4, TR5 and TR6. The literal suffixes used with the numeral 60' are for a purpose similar to that of the suffixes used with 60. The conductors 60a, 60b and 60c lead to the brushes 56 of the first group of impulse disks da, db and dc, respectively; while the conductors 60'a, 60'b and 60'c lead to the brushes of the second group of impulse disks d'a, d'b, d'c. The rate connecting board, indicated as a whole by RC, consists of a plurality of jacks arranged in banks of as many jacks each as there are workmen in that department in order that all of the relay units may operate at the same rate. The bank or strip of jacks indicated by r1 is connected with the conductor 71, the bank of jacks r2 is connected with the conductor 72, while the banks r3 and r4 are connected with the conductors 73 and 74, respectively. The conductors 71, 72, 73 and 74 lead to the brushes 75 of the rate disks R1, R2, R3 and R4, respectively. These disks are mounted upon the rate shaft RS so as to be rotated therewith. Associated with the rate jacks are the rate plugs rp1 to rp6, one for each workman. These rate plugs are electrically connected with the spring contacts 76 of the switches S1 to S6, respectively. If it is desired to involve a workman's registers with a certain rate, the workman's rate plug is inserted in one of the banks of jacks. For the sake of example, let us assume that workman No. 101, whose switch is S1, works at a rate represented by the disk R1 and that his rate plug rp1 is inserted in one of the jacks of the bank r1. With the switch S1 thrown to the "in" position, the circuits through the time-register TR1 and through the accumulating windings A1 of the relay unit 101 may be traced as follows, assuming the impulse shaft IS to be rotated in the direction indicated by the arrow: from the positive main M of a suitable source of electric current to the conductor 77, the rate shaft RS, the rate disk R1, brush 75, to the point 78. There the current divides into two parallel paths, one path leading through the accumulating windings A1, while the other path leads through the time-register TR1. The path through the accumulating windings A1 leads from point 78 to conductor 71, to one of the jacks of the bank r1, rate plug rp1, conductor 79, spring contact 76 of switch S1, the companion contact 80, conductor 81, contact member 17 which is associated with the accumulating windings, thence through the a-phase accumulating winding of the relay unit 101, thence by way of conductor 60a to brush 56, segment of disk da, shaft IS, conductor 87, back to the negative main N. The other parallel path, viz., that leading through the time-register TR1 is traced from the point 78 to conductor 91, spring contact 92, the companion contact 93, conductor 94, through the a-phase winding of the register TR1 to the common conductor 60a, and from there back to the negative main as just described.

As the shaft IS continues to rotate the circuit will be closed successively by the disks db and dc to send successive impulses through the b-phase and c-phase windings of the time-register TR1 and the accumulating member of the relay unit 101. It will not be necessary to trace these circuits, for the reason that they are the same as the circuits already traced, except that the return paths will be formed by the conductors 60b and 60c. By regarding the angular disposition of the peripheral segments of the impulse disks, it will be observed that a set of three impulses, which may be called a cycle, will be sent through the connected registers TR1, TR2, TR3 and the accumulating windings of the relay unit 101, 102 and 103 during one-half of a revolution of the shaft IS, and that during the other half revolution of the shaft, a cycle of impulses will in a similar manner be sent through the connected registers TR4, TR5, TR6 and the accumulating windings of the relay units 104, 105 and 106. If the number of registers is small, it is not necessary that they be thus divided into groups. For instance, in Fig. 1 all of the time-registers TR1 to TR6 and the accumulating windings of the relay units 101 to 106 might be connected to the conductors 60a, 60b and 60c, instead of connecting only half of the registers and relay units to those conductors, while the other half is connected to the conductors 60'a, 60'b and 60'c. The only advantage acquired by so dividing the registers into groups is to distribute the load on the battery or whatever the source of current may be. If all of the registers and relay units shown in Fig. 1 were connected to the same set of bus wires, the connected registers and corresponding relay units would all be actuated simultaneously. This would require a larger amount of current and would be a heavier drain on the battery. This may be obviated by dividing the registers into groups so that the registers of each group will be simultaneously actuated while the groups themselves will be successively actuated. It will thus be understood that the grouping of the registers is determined solely by the load it is desired to be put upon the battery. Whether or not the registers are divided into groups, the fact remains that according to my present invention the registers are simultaneously connected for actuation as distinguished from the system shown in my co-pending application, Serial No. 437,809, previously referred to herein, where the individual registers operate intercurrently by being "picked up" one after the other. In the specific embodiment of my invention as shown in Fig. 1, I have for the sake of illustration arranged the registers in two groups. However, as stated above, the time-registers and the accumulating windings of the relay units might as well be so connected as to be simultaneously connected for actuation. When I, therefore, say that according to my invention the registers are simultaneously connected for actuation I mean this in its broad sense, irrespective of whether there is any grouping or not of the registers.

In the above description of the accumulating circuits no particular reference was made to the rate at which the impulses would be sent through the registers and accumulating windings. We simply assumed that the circuits were closed through the rate disk R1. We will now take up for consideration the details of the rate-controlling mechanism and the circuit connections therefor. The ratchet wheel 63 is provided with thirty teeth. If we assume that the impulse shaft IS makes one revolution in two minutes, the rate shaft RS will make one revolution every hour, for the reason that during every revolution of the shaft IS the rate shaft is advanced one-thirtieth of a revolution. In order to facilitate a clear understanding of the mode of operation of the rate-controlling mechanism it will be assumed that a workman receives one cent in wages for every cycle of impulses sent through his register. As the workman is "picked up" once in every two minutes, it would follow upon the above assumption that if a rate disk closed the circuit every time that a workman was "picked up", he would receive a rate equal to thirty cents an hour. However, by so constructing the disk that during certain revolutions of the impulse shaft it remains in an open-circuit position, any desired rate may be secured. Thus, a disk to represent ten cents per hour would occupy a circuit-closing position only during ten revolutions of the impulse shaft during every hour. Such a disk is the rate disk R1, which, it will be observed, is provided with ten segments to be engaged by the associated brush 75. This means that the disk will be in a circuit-closing position during every third revolution of the impulse shaft. Assuming that the disk will close the circuit during the first revolution in every hour of the impulse shaft, the ten revolutions during which the disk will cause the circuit of the connected registers to be closed will be the following: 1st, 4th, 7th, 10th, 13th, 16th, 19th, 22nd, 25th and 28th, During the intervening revolutions the brush of the disk R1 will engage the insulation between the segments.

The rate disk R2 represents a rate of fifteen cents per hour. This is obtained by so constructing the disk that fifteen of the thirty revolutions per hour of the impulse shaft are, as it were, lost. That is to say, during those fifteen revolutions the brush of the disk will engage the insulation between the segments. It will be noticed that there are certain alternate segments, five in number, which are narrower than the five interposed segments. The object of this arrangement is to have the five narrow segments close the circuit during one revolution of the impulse shaft, while the wide segments each close the circuit during two consecutive revolutions of the impulse shaft. Accordingly, there will be fifteen revolutions during which the rate disk R2 will occupy a circuit-closing position, those revolutions being the following (assuming as before, that the disk will close the circuit during the first revolution in every hour of the shaft IS): 1st, 4th, 5th, 7th, 10th, 11th, 13th, 16th, 17th, 19th, 22nd, 23rd, 25th, 28th and 29th.

The rate disk R3 has been designed to represent a rate of twenty cents per hour. This is obtained by causing the disk to be in open-circuit position during ten out of the thirty revolutions per hour of the impulse shaft IS. Each of the ten segments with which the disk is provided allows the circuit to remain closed for two consecutive revolutions of the impulse shaft, thus closing the circuit for twenty cycles. This disk assumes an open-circuit position every third revolution of the impulse shaft, those revolutions being the following: 2nd, 5th, 8th, 11th, 14th, 17th, 20th, 25th, 26th and 29th.

Concerning the highest rate disk R4, which represents a rate of twenty-five cents per hour, it will be observed that it is provided with five wide segments separated by relatively narrow pieces of insulation. This disk assumes an open-circuit position during five of the thirty hourly revolutions of the impulse shaft. If we assume that at the beginning of the first revolution in every hour the brush of this disk is on a segment as shown, then the five revolutions which are omitted by the disk are the following: 5th, 11th, 17th, 23rd and 29th. If at the beginning of an hour the brushes of the disks engage an insulated portion, the "lost" revolutions would be distributed accordingly. In any case, the result is precisely the same. Nor is it necessary that the segments be distributed equidistantly around the peripheries of the disks. Ordinarily, it would be desirable to do this in order that there might not be too long a period in every hour during which the register circuits would remain open. For instance, if a register is to be actuated by ten cycles of impulses every hour, it is desirable that these cycles be distributed equally over that period rather than be bunched together, as it were, within a short interval. I have gone into this detailed explanation of how the rate mechanism has been designed to represent the certain specific rates in order to make clear its theory of operation. It will now be understood that given a certain period, say, one hour, the rate at which a register (or a relay unit) will be actuated depends upon the length of time during which the circuit of the register remains closed during every hour.

For the sake of simplicity it has been assumed in the design of the system shown in Fig. 1, that every cycle of impulses passing through the time-register will advance the same to indicate one tenth of an hour. If, therefore, ten cycles of impulses are sent through a time-register during every hour, the indication of the register will be one hour. Inasmuch as the disk R1 represents a rate of ten cents and therefore sends ten cycles of impulses every hour through the accumulating windings of the connected relay units, it is plain to see that the circuits of the time-registers may properly be controlled by the disk R1, so that this disk performs the double function of a wage-rate disk and a time disk. Of course, I might just as well have added another disk like the disk R1 upon the shaft RS for the time registers, but that would have been an unnecessary complication. The time-registers may be designed to indicate the time otherwise than in tenths of hours, in which case it would be necessary to have a separate time disk. That would be a mere matter of mechanical design.

Thus far our consideration of the system shown in Fig. 1 has been confined to the accumulating circuits and associated mechanisms. We will now take up the transfer feature of my invention. At J1, J2, J3, J4, J5 and J6 are indicated the job-registers, which consist of three-phase motors having ordinary counters connected thereto, as was explained in connection with the time-registers. These job-registers are connected through conductors C1, to C6, respectively, with the jack strips $j1$ to $j6$, respectively, of the job-switchboard JS. With this switchboard is associated a series of job plugs $jp1$ to $jp6$, each assigned to a workman. Thus we may assume that workman No. 101 is represented by the job plug $jp1$, workman No. 102 by the job plug $jp2$, etc. These job plugs consist of a pair of spring contacts which are normally closed. That is to say, these contacts are in a circuit-closing position when the plugs are in their "out" position, as are the plugs $jp2$ to $jp6$. The shorter contacts are connected to the common conductor 82, while the longer contacts are connected with the conductors 201 to 206, respectively, which conductors lead to the segments 1 to 6, respectively, of the commutator ring $js$. Whenever a plug is inserted in a jack the two contacts are separated and the common conductor 82 is cut out of circuit, as will be more fully explained below.

The commutator ring $rs$ of the transfer selector mechanism is similar to the commutator $js$, being provided with six insulated segments, numbers 1 to 6 as indicated, which are in electrical connection with the contacts 55, of the transfer windings T1 to T6, respectively, through the conductors 301 to 306, respectively. With the commutators $js$ and $rs$ coöperate brushes 118 and 119 fixed upon the selector shaft SS and adapted to successively engage the commutator segments. These brushes are disposed in angular alinement so that they engage corresponding segments simultaneously. The section of the shaft SS upon which the brushes are mounted is insulated from the section which carries the Geneva gear G. This gear has six teeth and is given one-sixth of a revolution for every revolution of the gear D. This is effected by providing the gear with a single tooth 120, which engages the gear G once during every revolution of the gear D. During every revolution, therefore, of the gear D, the brushes 118 and 119 will each remain in engagement with one of the segments of the associated commutator. The gear D is fixed upon the shaft TS, which is driven from any suitable source of power and at any speed greater than the speed of rotation of the impulse shaft IS. The shaft TS is shown as being divided into two insulated sections, upon one of which is mounted the group of impulse disks *ta*, *tb* and *tc*, and upon the other of which is mounted the group of impulse disks *t'a*, *t'b* and *t'c*. It will be observed that the metallic segments of corresponding disks are in angular alinement with each other. The brushes 125 of the first group of disks are connected with the conductors 100*a*, 100*b* and 100*c*, while the brushes 126 of the second group of disks are connected with the conductors 110*a*, 110*b*, 110*c*. With the parts in the position shown, the segments of disks *ta* and *t'a* will be first to engage their respective brushes as the shaft TS is rotated in the direction indicated by the arrow. Assuming that the segments of the disks *ta* and *t'a* engage their respective brushes, the circuit for the *a*-impulse will be completed as follows: from the positive main M to conductor 115, disk *t'a*, the associated brush 126, conductor 110*a*, through the *a*-phase winding of the wage-total register WT, conductor 130*a*, then through the *a*-phase winding of the job-total register JT, conductor 140*a*, then through the *a*-phase winding of the job-register J1, through the longer spring contact of the job plug *jp*1, then to conductor 201, segment No. 1 of the commutator *js*, brush 118, shaft SS, the brush 119, segment No. 1 of the commutator *rs*, conductor 301, contact 55 of the relay unit 101, contact 54, then through the *a*-phase winding of the transfer member T1, thence by means of conductor 100*a* through the disk *ta*, then through a portion of the shaft TS, and through conductor 116 back to the negative main N. As the shaft TS continues to rotate, the disks *tb*, *t'b* and *tc*, *t'c* will close the circuit for the *b*- and *c*-impulses, respectively. It will not be necessary to trace these circuits in detail for the reason that they are similar to the transfer circuits traced for the *a*-impulse. As the shaft TS completes one revolution the selector shaft SS will be given one-sixth of a revolution in order to carry the brushes from segments No. 1 to segments No. 2 of the commutators *js* and *rs*. With the brushes in this position, the transfer windings of the relay unit 102 and the corresponding job-register J2 will be selected for operation. As the brushes 118 and 119 come into successive engagement with the remaining segments, the transfer windings T3, T4, etc., will be "picked up" for operation.

Inasmuch as the registers WT and JT are included in the common conductors 110*a*, 110*b*, 110*c* and 140*a*, 140*b*, 140*c* of the transfer circuits, which lead through the job-registers, the actuations of the latter will be totalized in the registers JT and WT. There is, however, this difference between the registers JT and WT: whenever a workman's job plug is in the "out" position (as for instance, plug *jp*2), the circuit will not be closed through any job-register, but will be closed through the register WW and the common conductor 82. In this way the register WW acts as a waste-wage register, which has for its function the indication of wages accruing to a workman during an interval in which he has not been assigned to some job. As these wages are nonprofit-producing, they are properly called waste wages. The impulses pass through the total-wage register WT, so that the latter register will indicate the sum of the waste wages and the effective wages. Inasmuch as the job-total register indicates only the effective wages—that is to say, the wages charged against the jobs in that department—it follows that the indications of the waste-wage register WW will be the difference between the indications of the registers WT and JT. From what has been said in connection with the description of the operation of the motor mechanism or relay unit as shown in Figs. 2, 3 and 4, it will be understood how the actuations of the accumulating members A1 to A6 are successively transferred through the associated transfer windings into the proper job-registers and grand-total registers. It is, therefore, not believed necessary to repeat at this point the description of the mode of operation of the relay units in connection with the circuits as shown in Fig. 1.

I have yet to say a word or two with regard to the clearing of the time-registers and the wage-registers. I might state that I use the term wage-register as a convenient term for the accumulating member of a relay unit, since it is to all intents and purposes a wage-register. In Fig. 1 the parts represented as a whole by the reference characters A1, A2, A3, etc., are really wage-registers, whose actuating circuits are separate and distinct from the actuating circuits of the associated transfer members, the job-registers and the grand-total registers. In order to reset the wage-register and the time-registers, it is only necessary to reverse the order of the impulses impressed upon the registers. This will cause the armatures to rotate in a reverse direction and bring the numeral-wheels back to their normal positions. A simple way of running the registers backward is to reverse the rotation of the shaft IS, whereby the order of the impulses will be reversed.

It will be remembered that in connection with the register 14 in Figs. 3 and 5 I described how the contacts 16 and 17 are automatically disengaged from each other as the register passes to the "nine" position. This causes the registers to show all nines. In order to give the wheels an advancement to , bring them to the zero position, a forward "kick" is required to be sent through the register. This is done by closing the switch X and bringing the ends of the conductors k1 to k6 into contact with the mercury Hg contained in a suitable receptacle. In the drawing this receptacle is indicated as of conducting material, which is connected with the conductor 141. If we select the wage-register A1 for the extra "kick" to restore the numeral-wheels to their zero position, the circuit is completed as follows: from the positive main M to conductor 142, switch X, conductor 141, mercury Hg, conductor k1, contact 16, the b-phase winding of the register, conductor 60b, disk db, shaft IS, conductor 87, back to the negative main N. In a similar manner will the extra impulses be sent through the other wage-registers as the shaft IS is rotated, and it is not thought necessary to trace these circuits, as they will be readily understood. For the sake of having Fig. 1 as simple as possible, I have not shown any zero contacts associated with the time-registers. From what has gone before, however, it will be easily understood how such contacts may be arranged in order to cause disconnection of the registers as the numeral-wheels pass to the "nine" position. This has been fully explained in connection with the wage-registers A1, etc.

During the clearing operation of the wage-registers and time-registers, the registers located in the transfer circuits are entirely separate and distinct from the accumulating circuits. It might happen that after a wage-register has been reset to zero, the common member of the differential transmission connections between the two armatures 8a and 8t will not be in its normal position, which is the position indicated in Fig. 4. It is essential, however, in accumulating de novo into the wage-registers that the contacts 54 and 55 be in open-circuit position; otherwise the transfer member would be actuated to cause impulses to pass through the connected job-register when no impulses had accumulated in the wage-register. It is, therefore, required that after the decumulation of a wage-register the differential gearing be set to what might be termed its zero position. This is done by sending through the transfer member of the relay unit a number of impulses sufficient to rotate the common member until the projection 53 of the contact 54 enters the recess 52. This is most readily done by closing the switch Y and rotating the shaft TS, whereupon the transfer members of the various relay units will be successively selected to receive these extra impulses. To trace one of these resetting circuits, let us select the relay unit 101. The circuit may be traced as follows: from the positive main M to conductor 160, switch Y, conductor 161, through the selector shaft SS, brush 119, segment No. 1 of the commutator rs, conductor 301, across the closed contacts 55 and 54 of the transfer member T1, then by means of conductor 100a to the impulse disk ta, and from there through the conductor 116 back to the negative main N. In a similar manner may be traced the resetting circuits for the transfer members of the other relay units. As soon as the common member reaches its normal position, the contacts 54 and 55 separate and the circuit through the transfer member is interrupted. The parts thus being brought back to their normal position, the relay units are again in condition to receive new accumulations. It will be observed that the resetting impulses do not affect the job-registers or any of the totalizing-registers WW, JT and WT, since the closing of the switch Y completes the resetting circuits around the job-registers and the other totalizing-registers. In case the transfer members are provided with registers, as shown in Fig. 3, (which provision, however, is not necessary, as already explained) then the connection between the register 28 and the armature 8t will be altered from that shown in Fig. 3 to a pawl and ratchet connection, which will cause the actuation of the register when the transfer member is operating in its forward or normal direction, but will allow the pawl to slide over the associated ratchet wheel without imparting movement to the register when the transfer member is actuated in the reverse direction to reset the differential to zero position. The object of this arrangement is to prevent the register 28 from indicating an incorrect total, which it would do if the actuations of the transfer member during the resetting of the differential were communicated to the register. I have not considered it necessary to show this arrangement, for the reason that it is obvious to anyone skilled in mechanics.

In order to insure a complete opening of the contacts 16 and 17 associated with the accumulating windings and of the contacts 54 and 55 associated with the transfer member, I connect only two of the phases in series with the associated contacts, leaving the connection of the third phase independent of the contacts.

Referring to Fig. 1, it will be observed that the a-phase windings of the accumulating members A1, A2, etc., are connected directly to the circuit conductors 81, 82, etc., while the b- and c-phase windings are connected in series with the contacts 16 and 17. It will be remembered that the function of the contacts 16 and 17 is to open the circuit through the accumulating windings when the register has reached its zero position during the decumulating operation. Inasmuch as during this operation the windings are energized in the order of "c", "b" and "a", the a-phase winding will be the last one to be energized to give the armature the final movement to bring the register wheels to their zero position. Now, if the circuit of this winding were in series with the contacts 16 and 17 like the other windings, then as soon as the contacts 16 and 17 were separated by the action of the cam 19, as shown in Fig. 5, the final movement of the armature might not be complete, but there would be a sort of vibrating of the armature. However, in allowing the circuit through the a-phase winding to remain closed under these conditions, even after the contacts 16 and 17 are separated, the final movement of the armature will in any case be complete and insure a full opening of the contacts. Any impulses that might continue to pass through the winding would not result in any movement of the armature. The same arrangement is made use of in connection with the contacts 54 and 55 associated with the transfer members T1 and T2, etc. In this case, however, it is the c-phase winding which is arranged in circuit independently of the contacts. This is because during the normal operation of this member the windings are energized in the order of "a", "b" and "c". The c-phase winding being the last to be energized to open the contacts 54 and 55, is therefore connected in circuit independently of these contacts in order to insure their complete opening as just described in connection with the contacts 16 and 17.

It will be seen from the above that when the phase unactuated by the associated contacts is energized, the contacts are fully and completely opened, cutting out the other two phases and thereby stopping the actuation of the three-phase motor. This action occurs, of course, only at the proper time as determined by the indications in the register or the equivalent thereof. By this arrangement the complete opening of the contacts is secured almost entirely by electromagnetic means and is practically independent of the shape of the cam or the other mechanical members that serve to open the contacts. This would not be the case if the same members that opened the contacts were also instrumental in cutting off the electrical impulses that produce such opening. Although I have shown the phase which is uninfluenced by the contacts associated with the transfer member as being different from the phase which is independent of the contacts associated with the accumulating member of the relay unit, nevertheless this precise arrangement is not necessary. I have shown it here simply because in the particular arrangement of circuits shown in this application that precise arrangement has some advantages. The particular phase which is to be independent of the associated contacts will, of course, be determined by the particular arrangement of the circuits in connection with which the relay unit is to be used.

In the foregoing description of a preferred embodiment of my invention I have not endeavored to enumerate all of the advantages residing in the different features and arrangements, nor have I tried to set forth the many uses to which such features and arrangements might be put other than the specific use herein described for the sake of illustration only. It is, moreover, obvious that certain details and features of my invention may be employed without the use of certain other features and that many modifications will suggest themselves to those versed in the art without departing from the scope of my invention as defined in the appended claims.

Having thus described my invention, what I claim as new and desire to secure by Letters Patent of the United States is:

1. In an electromagnetic device, the combination of a plurality of electromagnets arranged in two groups, an armature associated with each group of electromagnets to be actuated thereby, the direction of rotation of the armatures being opposite, and differential transmission-connections between said armatures, said connections including a common member adapted to be rotated at a rate proportional to the difference between the rates of actuation of the armatures.

2. In an electromagnetic device, the combination of a plurality of electromagnets arranged in two groups, an armature associated with each group of electromagnets to be actuated thereby, the direction of rotation of the armatures being opposite, differential transmission-connections between said armatures, said connections including a common member adapted to be rotated at a rate proportional to the difference between the rates of actuation of the armatures, and a switch operated by said common member to control the circuit through one group of electromagnets.

3. In an electromagnetic register-actuating device, the combination of a plurality of electromagnets arranged in two groups, the electromagnets of each group being adapted to be successively energized at a predetermined frequency, an armature associated with each group of electromagnets to be actuated thereby, the direction of rotation of the armatures being opposite, differential transmission-connections between said armatures, said connections including a common member adapted to be rotated at a rate proportional to the difference between the rates of actuation of the armatures, a register connected for actuation with the armature of one group of electromagnets, and a switch operated by said common member to close the circuit through the other group of electromagnets after the register-operating armature has been actuated a certain amount and to open said circuit after the other armature has been actuated an equal amount.

4. As a unitary structure, a register, comprising, in combination, a pair of electromagnetic actuating mechanisms, a normally open switch for controlling the circuit through one of said mechanisms, a series of numeral-wheels associated with the other mechanism to be actuated thereby, means for closing said switch upon the operation of said other mechanism, and means for opening said switch upon operation of said first-mentioned mechanism.

5. The combination of a source of electric impulses, a plurality of switches, an electromagnetic mechanism associated with each switch for controlling the same, connections between said source and said mechanisms for simultaneously actuating the mechanisms in a certain direction until the switches are closed, and independent circuit connections for successively actuating the mechanisms in a reverse direction until the switches are opened.

6. In an accounting system, the combination of a plurality of individual registers, a source of electric impulses for actuating said registers, means for simultaneously connecting said registers for actuation, a totalizing-register, and means for successively totalizing the actuations of the individual registers in said totalizing-register.

7. In an accounting system, the combination of a plurality of individual registers, a source of three-phase electric impulses for actuating said registers, means for simultaneously connecting said registers for actuation, a totalizing-register, and means for successively totalizing the actuations of the individual registers in said totalizing-register.

8. In an accounting system, the combination of a source of electric impulses, a plurality of individual registers adapted to be actuated by said impulses at a rate dependent upon the frequency thereof, circuit connections between said source and said registers for simultaneously connecting the registers with said source for actuation, an impulse-receiving device associated with each of said registers, a second source of electric impulses, circuit connections between said devices and said second source of impulses for actuating said devices in succession, a switch included in the circuit of each impulse-receiving device, means whereby said switch is under the joint control of the impulse-receiving device and the associated register to cause actuation of the latter at a rate dependent upon the rate of actuation of the associated register, a plurality of totalizing-registers included in the circuit connections of said impulse-receiving devices, and means for selectively connecting the individual registers or any number thereof with any of said totalizing-registers.

9. The combination of a source of three-phase electric impulses, a plurality of switches, an electromagnetic mechanism associated with each switch for controlling the same, connections between said source and said mechanisms for simultaneously actuating the mechanisms in a certain direction until the switches are closed, and independent circuit connections for successively actuating the mechanisms in a reverse direction until the switches are opened.

10. The combination of a source of electric impulses, a plurality of switches, an electromagnetic mechanism associated with each switch for controlling the same, connections between said source and said mechanisms for simultaneously actuating the mechanisms in a certain direction until the switches are closed, independent circuit connections for successively actuating the mechanisms in a reverse direction until the switches are opened, a wage-register associated with each actuating mechanism, a plurality of totalizing registers, and means for successively connecting said individual registers or any number thereof with any totalizing-register, whereby the actuations of the individual - registers are totalized in the connected totalizing-register.

11. In an accounting system, the combination of a plurality of individual wage-registers, a source of electric impulses, circuit connections between said source and said wage-registers for simultaneously connecting the registers for actuation at a predetermined rate, a plurality of job-registers, a second source of electric impulses, circuit connections between said second source and said job-registers, and means included in said last-mentioned circuit connections for successively associating said wage-registers or any number thereof with any job-register to totalize the actuations of the wage-registers in the connected job-register.

12. In an accounting system, the combination of a plurality of individual wage-registers, a source of electric impulses, circuit connections between said source and said wage-registers for simultaneously connecting the registers for actuation, rate-controlling mechanism in said circuit connections for determining the rate of actuation of any register, a plurality of job-registers, a second source of electric impulses for actuating said job-registers, circuit connections between said second source and said job-registers, an impulse-receiving device associated with each wage-register and included in said last-mentioned circuit connections, a switch in the circuit of each impulse-receiving device and adapted to be jointly controlled by the associated wage-register and impulse-receiving device for intermittently closing the circuit of the impulse-receiving device during an interval dependent upon the amount of previous actuation of the wage-register, and selector mechanism in the circuit connections of said job-registers and impulse-receiving devices for simultaneously connecting said devices with any job-register, whereby the actuations of the wage-registers are totalized in the connected job-register.

13. In an accounting system, the combination of a source of electric impulses, a plurality of individual registers, means for simultaneously connecting said registers with said source for actuation, a totalizing-register, and means for successively connecting said individual registers with said totalizing-register to totalize the actuations of the individual registers in said totalizing-register.

14. In combination, a plurality of registers, means for simultaneously actuating said registers at a predetermined rate, and means for automatically totalizing the actuations of said registers in succession as said actuations accumulate and without interfering with their accumulation.

15. In combination, a plurality of registers, a source of electric impulses, means for simultaneously connecting said registers with said source for actuation at a predetermined rate, a plurality of totalizing-registers, a second source of electric impulses for actuating said totalizing-registers, and means for successively associating said individual registers with any totalizing-register to cause actuation of said totalizing-register proportionately to the sum of the actuations of the associated individual registers.

16. In combination, a plurality of individual wage-registers, a corresponding plurality of individual time-registers, a source of electric impulses, circuit connections between said source and said registers for actuating the same, rate-controlling mechanism in said circuit connections for determining the rate of actuation of any wage-register without affecting the rate of actuation of the time-registers, a plurality of job-registers, a second source of electric impulses, circuit connections between said second source and said job-registers, and means included in said last-mentioned circuit connections for successively actuating said wage-registers or any number thereof with any job-register to totalize the actuations of the wage-registers in the connected job-register.

17. In combination, a plurality of individual wage-registers, a corresponding plurality of individual time-registers, a source of electric impulses, circuit connections between said source and said registers for actuating the same, rate-controlling mechanism in said circuit connections for determining the rate of actuation of any wage-register without affecting the rate of actuation of the time-registers, a plurality of job-registers, a second source of electric impulses for actuating said job-registers, circuit connections between said second source and said job-registers, an impulse-receiving device associated with each wage-register and included in said last-mentioned circuit connections, a switch in the circuit of each impulse-receiving device and adapted to be jointly controlled by the associated wage-register and impulse-receiving device for intermittently closing the circuit of the impulse-receiving device during an interval dependent upon the amount of previous actuation of the wage-register, and selector mechanism in the circuit connections of said job-registers and impulse-receiving devices for simultaneously connecting said devices with any job-register, whereby the actuations of the wage-registers are totalized in the connected job-register.

18. In an accounting system, the combination of a plurality of individual wage-registers, a source of three-phase electric impulses, circuit connections between said source and said wage-registers for simultaneously connecting the registers for actuation at a predetermined rate, a plurality of job-registers, a second source of three-phase electric impulses, circuit connections between said second source and said job-registers, and means included in said last-mentioned circuit connections for successively associating said wage-registers or any number thereof with any job-register to totalize the actuations of the wage-registers in the connected job-register.

19. In an accounting system, the combination of a source of three-phase electric impulses, a plurality of individual registers, means for simultaneously connecting said registers with said source for actuation, a totalizing-register, and means for successively connecting said individual registers with said totalizing-register to totalize the actuations of the individual registers in said totalizing-register.

20. In combination, a plurality of individual wage-registers, a corresponding plurality of individual time-registers, a source of three-phase electric impulses, circuit connections between said source and said registers for actuating the same, rate-controlling mechanism in said circuit connections for determining the rate of actuation of any wage-register without affecting the rate of actuation of the time-registers, a plurality of job-registers, a second source of three-phase electric impulses for actuating said job-registers, circuit connections between said second source and said job-registers, an impulse-receiving device associated with each wage-register and included in said last-mentioned circuit connections, a switch in the circuit of each impulse-receiving device and adapted to be jointly controlled by the associated wage-register and impulse-receiving device during an interval dependent upon the amount of previous actuation of the wage-register, and selector mechanism in the circuit connections of said job-registers and impulse-receiving devices for simultaneously connecting said devices with any job-register, whereby the actuations of the wage-registers are totalized in the connected job-register.

21. In combination, a plurality of individual registers, actuating circuits therefor, means for simultaneously actuating said registers, a plurality of totalizing-registers, actuating circuits therefor independent of said first-mentioned actuating circuits, and means for successively totalizing the actuations of said individual registers in any of said totalizing registers.

22. In combination, a plurality of switches, an actuating member associated with each switch for opening and closing the same, electromagnetic mechanism associated with each member for actuating said member, a source of electric impulses for simultaneously operating said mechanisms to actuate the associated members a predetermined amount in a certain direction, whereby the switches are held in closed position, and a second source of electric impulses for successively operating said mechanisms to actuate the associated members the same amount in the reverse direction, whereupon the switches are automatically opened.

23. In combination, a plurality of switches, an actuating member associated with each switch for opening and closing the same, electromagnetic mechanism associated with each member for actuating said member, a source of three-phase electric impulses for simultaneously operating said mechanisms to actuate the associated members a predetermined amount in a certain direction, whereby the switches are held in closed position, and a second source of three-phase electric impulses for successively operating said mechanisms to actuate the associated members the same amount in the reverse direction, whereupon the switches are automatically opened.

24. In an accounting system, the combination of a plurality of switches, an actuating member associated with each switch for opening and closing the same, electromagnetic mechanism associated with each member for actuating said member, a register connected with each mechanism to be actuated thereby, a source of electric impulses for simultaneously operating said mechanisms to actuate the associated members a predetermined amount in a certain direction, whereby the registers are actuated at a rate dependent upon the frequency of the impulses, the switches remaining closed during such actuation, a second source of electric impulses for successively operating said mechanisms to actuate the associated members the same amount in the reverse direction, whereupon the switches are automatically opened, a plurality of totalizing-registers adapted to be connected with said second source of impulses for actuation, and means for selectively involving said individual registers or any number thereof with any of said totalizing-registers, whereby the actuations of the individual registers are successively totalized in the connected totalizing-register.

25. In an accounting system, the combination of a plurality of switches, an actuating member associated with each switch for opening and closing the same, electromagnetic mechanism associated with each member for actuating said member, a register connected with each mechanism to be actuated thereby, a source of three-phase electric impulses for simultaneously operating said mechanisms to actuate the associated members a predetermined amount in a certain direction, whereby the registers are actuated at a rate dependent upon the frequency of the impulses, the switches remaining closed during such actuation, a second source of three-phase electric impulses for successively operating said mechanisms to actuate the associated members the same amount in the reverse direction, whereupon the switches are automatically opened, a plurality of totalizing-registers adapted to be connected with said second source of impulses for actuation, and means for selectively involving said individual registers or any number thereof with any of said totalizing-registers, whereby the actuations of the individual registers are successively totalized in the connected totalizing-register.

26. In an accounting system, the combination of a plurality of switches, an actuating member associated with each switch for opening and closing the same, electromagnetic mechanism associated with each member for actuating said member, a register connected with each mechanism to be actuated thereby, a source of electric impulses for simultaneously operating said mechanisms to actuate the associated members a predetermined amount in a certain direction, whereby the registers are actuated at a rate dependent upon the frequency of the impulses, the switches remaining closed during such actuation, a second source of electric impulses for successively operating said mechanisms to actuate the associated members the same amount in the reverse direction, whereupon the switches are automatically opened, a plurality of totalizing-registers adapted to be connected with said second source of impulses for actuation, means for selectively involving said individual registers or any number thereof with any of said totalizing-registers, whereby the actuations of the individual registers are successively totalized in the connected totalizing-register, means for clearing said individual registers, and means for resetting the switch-actuating members to normal position after such clearing.

27. The combination of a source of three-phase electrical impulses, an electromagnetic actuating mechanism having windings adapted to be energized by said three-phase source, and a pair of contacts included in the circuit connections between said source and said mechanisms, the circuit through the windings energized by the impulses of two of the phases being closed through said contacts, while the circuit of the impulses of the third phase is independent of said contacts.

28. In an electromagnetic device, the combination of a plurality of electromagnets arranged in two groups, an armature associated with each group to be actuated thereby, and differential mechanism between said armatures adapted to be operated by operation of either armature in one direction relatively to the other and to remain at rest for equal operation of both armatures in a relatively reverse direction.

29. As a unitary structure, a register comprising in combination a pair of electromagnetic actuating mechanisms, a normally open switch for controlling the circuit through one of said mechanisms, and devices for closing said switch upon operation of one mechanism and again opening the switch upon operation of the other mechanism.

30. In combination, a plurality of wage registers, means for simultaneously actuating said registers at a predetermined rate or rates, and electrically actuated means for automatically totalizing the actuations of said registers.

31. In combination, a plurality of wage registers, electrically operated means for simultaneously actuating said registers at predetermined rates, and means for concurrently totalizing said actuations.

32. In combination, a plurality of wage registers, electrically operated means for simultaneously actuating said registers at a predetermined rate or rates, and electrically operated means for automatically totalizing the amount of actuations of said registers.

33. In combination, a plurality of wage registers, electrically operated means for simultaneously actuating said registers at predetermined rates, and electrically operated means for concurrently totalizing the amount of said actuations.

In witness whereof, I hereunto subscribe my name this second day of October A. D. 1909.

WILLIAM J. CRUMPTON.

Witnesses:
 ALBERT C. BELL,
 A. A. THOMAS.